(No Model.)
W. JOHNSTON.
VARIABLE COUPLING JOINTS FOR SHAFTING.
No. 310,138. Patented Dec. 30, 1884.
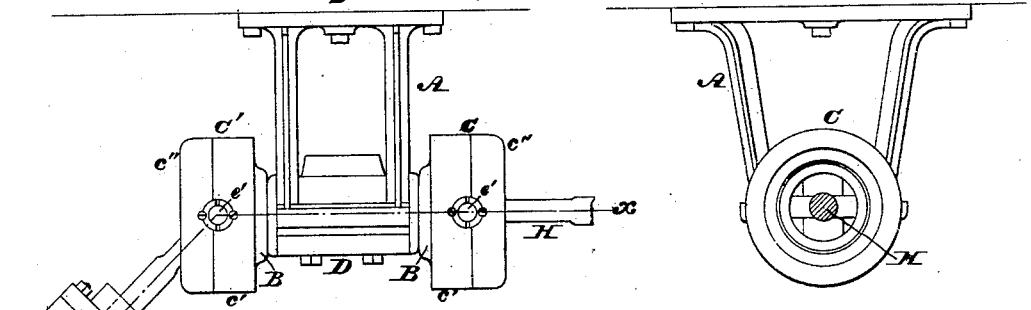
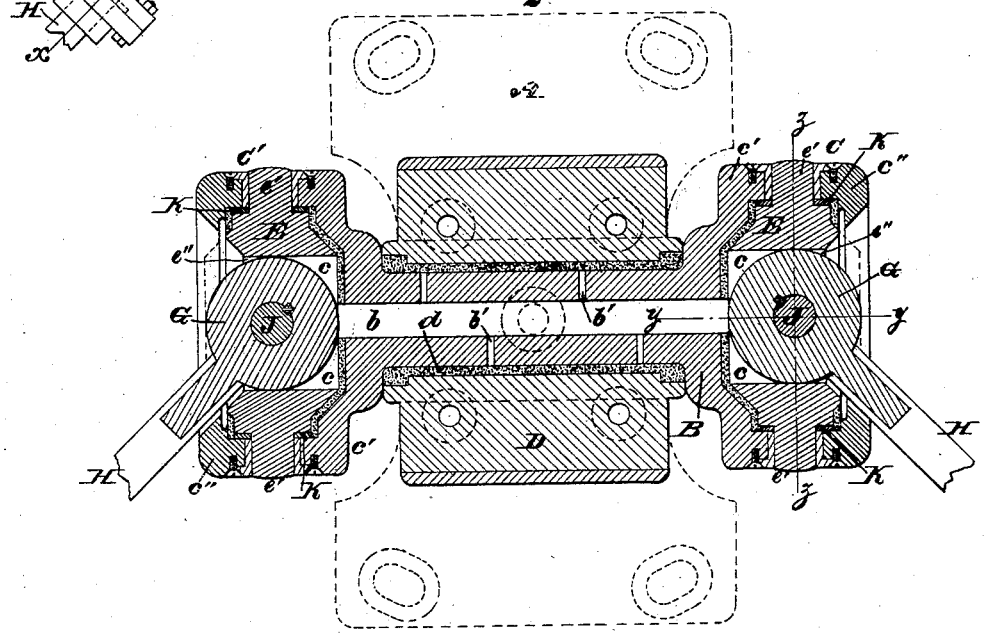
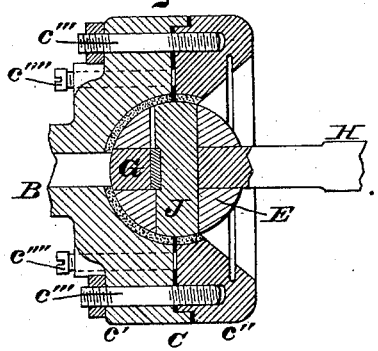 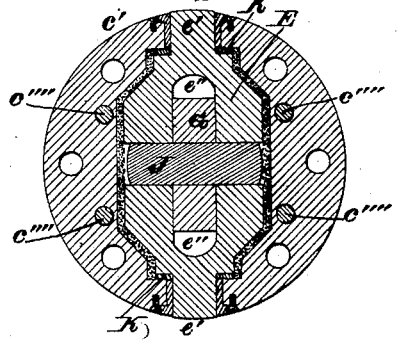
WITNESSES:
L. Douville
W. F. Kircher
INVENTOR:
Wm Johnston
BY John A. Wiederheim
ATTORNEY

UNITED STATES PATENT OFFICE.

WILLIAM JOHNSTON, OF PHILADELPHIA, PENNSYLVANIA, ASSIGNOR TO JOHN H. SCOTT, OF SAME PLACE.

VARIABLE COUPLING-JOINT FOR SHAFTING.

SPECIFICATION forming part of Letters Patent No. 310,138, dated December 30, 1884.

Application filed October 29, 1884. (No model.)

*To all whom it may concern:*

Be it known that I, WILLIAM JOHNSTON, a citizen of the United States, residing in the city and county of Philadelphia, State of Pennsylvania, have invented a new and useful Improvement in Variable Coupling-Joints for Shafting, which improvement is fully set forth in the following specification and accompanying drawings, in which—

Figure 1 represents a side elevation of my improved variable coupling-joint supported by a hanger. Fig. 2 represents a sectional end view thereof. Fig. 3 represents a horizontal section thereof, enlarged, in line $xx$, Fig. 1. Fig. 4 represents a section thereof in line $yy$, Fig. 3. Fig. 5 represents a section thereof in line $zz$, Fig. 3.

Similar letters of reference indicate corresponding parts in the several figures.

My invention relates to improvements in variable coupling-joints for shafting for which Letters Patent No. 276,420 were granted to William Johnston, April 24, 1883; and it consists of means for supporting the same, whereby a great reduction of labor and time is effected in making the connections and a strong and durable joint formed at a reduced expense, and also in further details, hereinafter fully set forth.

Referring to the drawings, A represents a hanger, in which the axle or shaft B, connecting the two heads C C', has a suitable bearing, D, which latter forms a solid and rigid connection between the heads, and may be suitably lined with Babbitt or other anti-frictional metal, as shown at $d$, Fig. 3. The axle B has a longitudinal opening, $b$, communicating with recesses $c$ in the heads C and C'; and leading at right angles from the outer surface of the axle to the said opening $b$ are small holes or passages $b'$ $b'$, by means of which the working portions of the heads, as well as the bearing of the axle, can be easily lubricated, the working of the shafts causing a partial vacuum in the recesses of the head, the lubricating material being thus drawn therein. The heads are formed of two sections, $c'$ $c''$, which are secured together by bolts $c'''$. Set-screws $c''''$ pass through section $c'$, bearing upon section $c''$, and between the sections is placed rubber or other elastic packing. By these means the sections are adjustable, so that the wear due to the contact of the block E, hereinafter described, with a portion of their surfaces, might be compensated. The section $c''$ is annular in form, and has a depression opposite to and facing the one in section $c'$. In the depressions of the sections $c'$ and $c''$ is the switch or oscillating block E, having journals $e'$, which rest on said sections or in bearings formed thereon. The swiveled or oscillating block E has a longitudinal slot, $e''$, for the reception of a circular disk, G, of steel, rigidly secured to or integral with a short shaft, H. Through the center of both disk and block, and at right angles to the slot $e''$, is an opening, in which a short bar, J, is inserted and keyed or otherwise secured to the disk, thus securing the said disk within the block E, and also assisting in giving additional bearing-surface for the same. Between the block E, which is movable in its bearings at right angles to the movements of the disk, and the sections $c'$ and $c''$ of the head, a lining of anti-friction metal may be placed, and between the shoulder ends of the said block E and the contact parts therewith of the said sections washers K, of compressed paper, leather, or a like substance, may be employed, preventing wear and also a lateral motion of the block. Each of the shafts H being movable within forty-five degrees in any direction, they may together make a right angle, if required.

By this form of variable joint a larger bearing-surface is obtained within any given space than has heretofore been known, while it is also rigid, compact, and durable.

When the variable couplings are to be erected, the end of each movable shaft of the coupling is connected to the ends of the shaft to be run at an angle to each other, care being taken that the hangers or floor-stands have a solid foundation, as it is necessary that the short movable shaft of the coupling be in line with the driver as well as the driving-shaft, so that the variable coupling may run smooth and noiselessly. If the shafting to be connected is run at less than a right angle, the angle is divided equally between them; but when the shafting is required to run at very high speed and at right angles it is best to connect one or more single couplings, so that the shafts connected by any coupling will not make a greater angle than thirty degrees with each other.

Having thus described my invention, what I claim as new, and desire to secure by Letters Patent, is—

1. The axle B, in combination with heads C C' and hanger A, having a bearing, D, for the said axle B, substantially as described.

2. The axle B, having openings $b$ $b'$ $b'$, in combination with the head C, having opening $c$, swivel-block E, and bearing D, substantially as described.

3. The swivel-block E, having longitudinal slot $e''$, in combination with the disk G, shaft H, and bar J, substantially as described.

4. In a variable coupling device, the flat disk G, having integral therewith the bar J, substantially as described.

5. In a variable coupling device, the head C, composed of the sections $c'$ and $c''$, adjustably connected by bolts $c'''$, and set-screws $c''''$, substantially as described.

6. The head C, composed of the sections $c'$ and $c''$, adjustably connected, in combination with block E, disk G, shaft H, and bar J, substantially as described.

7. The head C, having one of its sections extended so as to constitute an axle, B, in combination with the bearing D, substantially as described.

8. Heads C C', in combination with axle B, block E, disk G, shaft H, and bar J, substantially as described.

WILLIAM JOHNSTON.

Witnesses:
JOHN A. WIEDERSHEIM,
A. P. GRANT.